April 19, 1938.  R. D. CONKLIN  2,114,334
PRESSURE FLUID ENGINE
Filed Feb. 4, 1937
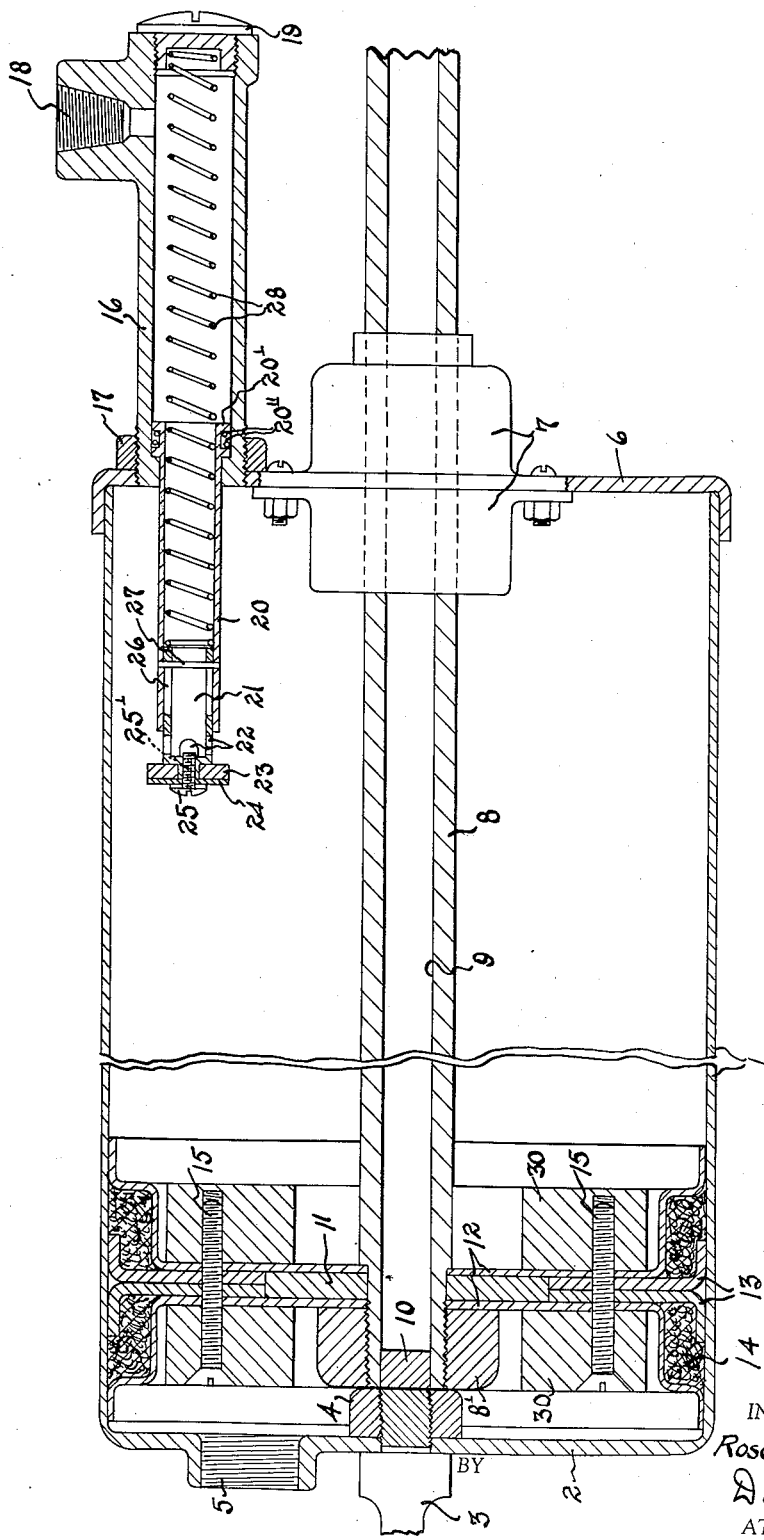
INVENTOR.
Roscoe D. Conklin
BY Darby & Darby
ATTORNEYS Patented Apr. 19, 1938

2,114,334

UNITED STATES PATENT OFFICE 2,114,334

PRESSURE FLUID ENGINE

Roscoe D. Conklin, Rahway, N. J., assignor to National Pneumatic Company, New York, N. Y., a corporation of West Virginia Application February 4, 1937, Serial No. 123,977

3 Claims. (Cl. 121—44)

This invention relates to improvements in pressure fluid engines particularly of the vacuum type as employed on vehicles such as busses for operating the doors and similar equipment.

The general object of the invention is to provide in a simplified inexpensive structure, although thoroughly rugged and practical, a vacuum engine particularly useful for the operation of doors on vehicles in which a cushioning action is provided to retard the speed of movement of the engine during movement in one direction only as for example in door opening movement.

The other objects of the invention will be apparent from the following description.

This invention resides substantially in the combination, construction, arrangement and relative location of parts, all as will be described in greater detail in the following specification.

In the accompanying drawing, the single figure is a longitudinal, vertical, central, cross-sectional view through the device with several parts in elevation.

The form of the engine shown in the drawing for the purpose of illustrating the invention comprises a cylinder 1 having one integral end wall 2. At 3 is a bracket of any suitable size and form by means of which the cylinder may be pivotally mounted on a support. The bracket is secured to the housing by means of a threaded stud which is engaged by means of a nut 4 as shown. The other or open end of the cylinder is closed by means of a detachable end wall or cover 6 which may be attached thereto in any suitable manner employing gaskets as is common. At 7 is a stuffing box of any desired construction shown as formed in part integral with the end wall 6 and in part as a removable member. The piston rod 8 extends through this stuffing box and although shown as having a longitudinal bore, as indicated at 9, closed at the inner end by means of a plug 10, it may, if desired, be solid. The outer end of the piston rod which is shown broken away is provided with any suitable form of attaching means for attaching it to the door or other linkage therefor.

The end wall 2 is provided with a threaded port 5 through which air may be introduced into and removed from the cylinder. Secured to the inner end of the piston rod by means of a nut 8' is a piston assembly comprising a flat washer-like disc 11, a pair of cup-shaped members 12 forming a peripheral channel in which the packing washers 13 and the packing material 14 are mounted. At 30 are a pair of rings which engage the outer faces of the members 12 and by means of which in conjunction with the screws 15 all of the parts of the piston assembly are bound together in conjunction with the nut 8' which also secures it on the piston rod.

The end wall 6 is provided with a threaded opening into which the tubular housing 16 is screwed and locked in place by means of the lock nut 17. This housing is closed at its outer end by means of a threaded cap screw 19 and is provided with an internally threaded hollow coupling member 18, the opening of which opens into the housing 16. Slidably mounted in the housing 16 is a tube 20 provided with an enlarged peripherally grooved head 20' in which a small spring 20'' is mounted. This spring frictionally engages the inner wall of the housing 16 so that it will retard the sliding movement of the tube 20 in the housing without preventing it. At 21 is a sleeve which is provided with a pair of diametrically opposed slots 26 through which a pin 27 mounted in the tube 20 passes. The outer end of the sleeve 21 is closed and provided with a small projection having a passage therethrough which is threaded to receive the sealing or seating washer 23 which is held on the sleeve by means of the outer washer 24 and the machine screw 25. The machine screw has a small passage 25' extending all the way through, such as would be made for example by a No. 60 drill. The outer end of the sleeve adjacent the closed end is provided with a series of passages 22 which are entirely within the tube 20 when the sleeve 21 is moved into the tube so that the valve member 23 engages the end of the tube. Lying between the end of the sleeve 21 and the cap screw 19 is a coil spring 28.

The engine operates from the position shown by opening the port 5 to atmosphere or a pressure source while connecting the port 18 to a vacuum source in the former instance or to the atmosphere in the latter. The result is that the piston assembly begins to move to the right, carrying the piston rod with it and causing the doors connected thereto to move preferably in an opening direction. When the piston assembly moves to the point where the head of screw 25 engages the adjacent ring 30 the sleeve 21 slides into the tube 20 compressing spring 28. Spring 20'' is sufficiently strong to resist any tendency of the tube 20 at this time to slide in the housing 16. The result is that the ports 22 are closed and the end of tube 20 is sealed by the valve disc 23. Continued movement of the piston assembly to the right then causes tube 20 to slide in housing 16, further compressing spring 28. From the time valve 23 engages tube 20 until the end of the stroke of the piston, the only way that air may escape from the right hand end of cylinder 1 is through the small bore 25' in the screw 25 which opens at the head end of the screw into the screw slot so that it is not sealed by its engagement with the ring 30. The piston assembly continues to move to the right until it is stopped by the engagement of the stuffing box with the adjacent member 12, the central opening in the ring 30 being large enough to receive it.

When the connections to the engine are reversed by suitable valves in an obvious manner so that port 18 is open to the atmosphere or to a super-atmospheric pressure source and port 5 is opened to a vacuum source in the former instance or to the atmosphere in the latter, the piston assembly begins its return movement in the opposite direction, that is to the left in the figure. As soon as this motion begins sleeve 21 begins to move out of tube 20 to expose the ports 22. This is caused by spring 28 and the fact that spring 20'' is sufficiently strong to hold the tube 20 against movement at this time. Thus the full pressure quickly builds up in the right hand end of cylinder 1 by full exposure of ports 22. The piston assembly, therefore, moves rapidly to its extreme left hand position while tube 20 less rapidly moves out of housing 16 by spring 28 until the head 20' engages the end of the housing.

This engine may be associated, for example, to doors of the double-leaf type in which the inherent toggle action involved is such that the door needs no cushioning during the closing operation but for completely satisfactory operation makes cushioning during opening movement desirable. The cushioning structure may be quickly switched to the other end of the cylinder when desired by unscrewing housing 16 and screwing it into port 5, in which event the engine will be cushioned on its stroke to the left instead of on its stroke to the right. This is a feature, for example, where in some cases the engine is mounted under the door and in other cases mounted over the door, necessitating cushioning at opposite ends with respect to each position. This is because when the engine is in these two different positions it is connected to the door in such a manner that for movement of the piston assembly toward the same end of the cylinder it is in one position opening the door and in the other closing it. This requires switching of the cushioning device from one end of the cylinder to the other. These different ways of connecting the engine to the door are well known in the art and form no part of the invention but explain the advantage of being able to easily switch the cushioning device.

It will be apparent to those skilled in the art that this invention may be embodied in other physical forms without departure from the novel features hereof. I do not, therefore, desire to be strictly limited to the disclosure which has been given in an illustrative sense but rather to the claims granted me.

What I claim is:

1. In a device of the type described, the combination comprising a closed cylinder having a piston therein, and means mounted on one end wall of the cylinder and engageable by the piston on its movement in one direction for restricting the exhaust of fluid from the cylinder, said means comprising a housing, a member slidably mounted in the housing and projecting therefrom into the cylinder, a spring for resisting movement of said member into the housing, means for retarding return movement of said member by said spring, and a valve slidably mounted on said member so as to be engaged by the piston and closed thereby, said valve having a restricted passage therethrough.

2. In a device of the type described, the combination comprising a closed cylinder having a piston therein, and means mounted on one end wall of the cylinder and engageable by the piston on its movement in one direction for restricting the exhaust of fluid from the cylinder, said means comprising a housing mounted in the end wall of the cylinder and closed at its outer end, a tube slidably mounted in the housing, means for frictionally resisting relative movement between the tube and housing, and a valve for closing the end of the tube when engaged by the piston, said valve having a restricted passage therethrough to provide a restricted exhaust passage when seated.

3. In a device of the type described, the combination comprising a closed cylinder having a piston therein and means mounted on one end wall of the cylinder and engageable by the piston on its movement in one direction for restricting the exhaust of fluid from the cylinder, said means comprising a housing closed at one end and mounted upon the cylinder wall, a tube slidably mounted in the housing and extending into the cylinder when projecting from the housing, resilient means for resisting relative movement between the tube and housing, a valve member slidably mounted on the tube for closing the projecting end when seated, said valve member having a restricted passage therethrough, and a spring lying between the valve member and the end of the housing.

ROSCOE D. CONKLIN.